(12) United States Patent
Sasaki et al.

(10) Patent No.: US 11,639,104 B2
(45) Date of Patent: May 2, 2023

(54) INDICATOR INSTRUMENT FOR VEHICLE (71) Applicant: DENSO CORPORATION, Kariya (JP)

(72) Inventors: Tatsuya Sasaki, Kariya (JP); Shigenori Yokochi, Kariya (JP)

(73) Assignee: DENSO CORPORATION, Kariya (JP)

( * ) Notice: Subject to any disclaimer, the term of this patent is extended or adjusted under 35 U.S.C. 154(b) by 541 days.

(21) Appl. No.: 16/795,463

(22) Filed: Feb. 19, 2020

(65) Prior Publication Data

US 2020/0180437 A1 Jun. 11, 2020

Related U.S. Application Data

(63) Continuation of application No. PCT/JP2018/031063, filed on Aug. 23, 2018.

(30) Foreign Application Priority Data

Sep. 28, 2017 (JP) .............................. JP2017-188646

(51) Int. Cl.
*H02K 7/116* (2006.01)
*B60K 35/00* (2006.01)
(Continued)

(52) U.S. Cl.
CPC ............. *B60K 35/00* (2013.01); *G01D 13/22* (2013.01); *H02K 7/116* (2013.01); *H02K 37/24* (2013.01);
(Continued)

(58) Field of Classification Search
CPC ...... G01D 13/265; G01D 11/28; G01D 11/10; G01D 13/22; G01D 13/04; H02K 7/116;
(Continued)

(56) References Cited

U.S. PATENT DOCUMENTS 8,365,680 B2 * 2/2013 Fukuda ................ G01D 13/265
116/284
9,431,874 B2 * 8/2016 Fukuda .................. G01D 11/10
(Continued)

FOREIGN PATENT DOCUMENTS

JP H0592648 U 12/1993
JP H11304547 A 11/1999
(Continued)

*Primary Examiner* — Ahmed Elnakib
*Assistant Examiner* — Leda T Pham
(74) *Attorney, Agent, or Firm* — Harness, Dickey & Pierce, P.L.C.

(57) ABSTRACT

An indicator instrument for a vehicle includes a rotational indicator that indicates a vehicle state parameter, and a stepper motor that rotates the rotational indicator. The stepper motor includes an output gear, a reduction mechanism, a motor casing housing the output gear and the reduction mechanism. The output gear includes an output shaft rotatable together with the rotational indicator, and a last-stage gear extending radially outward from the output shaft. The reduction mechanism includes a reduction gear engaged with the last-stage gear. The rotational indicator includes a rotational shaft press-fitted to a specified portion of the output shaft in the motor casing. The specified portion is displaced from the last-stage gear in an axial direction of the output shaft.

6 Claims, 11 Drawing Sheets

(51) Int. Cl.
    *G01D 13/22*     (2006.01)
    *H02K 37/24*     (2006.01)

(52) U.S. Cl.
    CPC .. *B60K 2370/164* (2019.05); *B60K 2370/167* (2019.05); *B60K 2370/171* (2019.05)

(58) Field of Classification Search
    CPC ........ H02K 21/14; H02K 37/14; H02K 37/24; H02K 1/14; B60K 35/00; B60K 37/02
    See application file for complete search history.

(56) References Cited

U.S. PATENT DOCUMENTS

| | | | |
|---|---|---|---|
| 2009/0173271 A1* | 7/2009 | Sigg | G01D 13/265 116/288 |
| 2011/0114009 A1 | 5/2011 | Fukuda et al. | |
| 2012/0318081 A1 | 12/2012 | Fukuda | |
| 2014/0033965 A1* | 2/2014 | Ookura | G01D 11/28 116/288 |

FOREIGN PATENT DOCUMENTS

| | | | |
|---|---|---|---|
| JP | 2002340631 A | 11/2002 |
| JP | 2009537844 A | 10/2009 |
| JP | 2010025837 A | 2/2010 |
| JP | 2010190748 A | 9/2010 |
| JP | 2011220853 A | 11/2011 |
| JP | 2012233761 A | 11/2012 |

\* cited by examiner

INDICATOR INSTRUMENT FOR VEHICLE

CROSS REFERENCE TO RELATED APPLICATIONS

The present application is a continuation application of International Patent Application No. PCT/JP2018/031063 filed on Aug. 23, 2018, which designated the U.S. and claims the benefit of priority from Japanese Patent Application No. 2017-188646 filed on Sep. 28, 2017. The entire disclosures of all of the above applications are incorporated herein by reference.

TECHNICAL FIELD

The present disclosure relates to an indicator instrument for a vehicle.

BACKGROUND ART

An indicator instrument for a vehicle includes a stepper motor rotating a rotational indicator. The stepper motor may include an output gear that is housed in a casing and rotatable together with the rotational indicator.

SUMMARY

An indicator instrument for a vehicle includes a rotational indicator configured to indicate a vehicle state parameter, and a stepper motor configured to rotate the rotational indicator. The stepper motor includes an output gear, a reduction mechanism, and a motor casing housing the output gear and the reduction mechanism. The output gear includes an output shaft rotatable together with the rotational indicator, and a last-stage gear extending radially outward from the output shaft. The reduction mechanism includes a reduction gear engaged with the last-stage gear. The rotational indicator includes a rotational shaft press-fitted to a specified portion of the output shaft in the motor casing. The specified portion is displaced from the last stage gear in an axial direction of the output shaft.

DESCRIPTION OF EMBODIMENTS

To begin with, examples of relevant techniques will be described.

An indicator instrument for a vehicle includes a stepper motor rotating a rotational indicator. The stepper motor may include an output gear that is housed in a casing and rotatable together with the rotational indicator.

To facilitate bonding the output gear and the rotational indicator and ensure high bonding strength therebetween, a rotational shaft of the rotational indicator may be press-fitted to the output gear. The rotational shaft may be inserted in an inner peripheral part of a last-stage gear of the output gear. When the rotational shaft is press-fitted to the inner peripheral part of the last-stage gear, strain due to press-fitting is likely to propagate to the last-stage gear which is located adjacent to the press-fitted portion. Thus, the last-stage gear may be plastically deformed. For example, a diameter of the last stage gear may be enlarged. Once an engagement failure between the last-stage gear and another gear occurs due to such plastic deformation of the last stage gear, a rotational malfunction of the rotational indicator caused by the engagement failure may be difficult to be solved.

The present disclosure provides an indicator instrument for a vehicle, which avoids a rotational malfunction of a rotational indicator.

According to a first aspect of the present disclosure, an indicator instrument for a vehicle includes a rotational indicator configured to indicate a vehicle state parameter, and a stepper motor configured to rotate the rotational indicator. The stepper motor includes an output gear, a reduction mechanism, and a motor casing housing the output gear and the reduction mechanism. The output gear includes an output shaft rotatable together with the rotational indicator, and a last-stage gear extending radially outward from the output shaft. The reduction mechanism includes a reduction gear engaged with the last-stage gear. The rotational indicator includes a rotational shaft press-fitted to a specified portion of the output shaft in the motor casing. The specified portion is displaced from the last stage gear in an axial direction of the output shaft. The motor casing includes a bearing configured to support the output shaft. The specified portion is between and displaced in the axial direction from the last-stage gear and a supported portion of the output shaft supported by the bearing.

According to the first aspect, the rotational shaft of the rotational indicator is press-fitted to the specified portion of the output shaft of the output gear which is displaced from the last-stage gear in the axial direction. Thus, strain due to press-fitting is less likely to propagate to the last-stage gear that is displaced from the specified portion. Thus, even inside the motor casing, the strain can be prevented from propagating to and plastically deforming the last-stage gear and causing an engagement failure between the last-stage gear and the reduction gear. Thus, a rotational malfunction of the rotational indicator caused by the engagement failure between the last-stage gear and the reduction gear can be avoided.

The rotational indicator may include an indicator body protruding radially outward from the rotational shaft and indicating the vehicle state parameter. The specified portion of the output shaft press-fitted to the rotational shaft may be displaced from the last-stage gear toward the indicator body.

In the rotational indicator including the indicator body protruding radially outward, a gravity center of the rotational shaft is likely to be close to the indicator body. When the specified portion of the output shaft press-fitted to the rotational shaft is displaced from the last-stage gear toward the indicator body, the gravity center of the rotational shaft is located close to or overlapped with the specified portion. Thus, the rotational shaft and the output shaft are less likely to be inclined relative to original rotational center axes of the shafts. Thus, a rotational malfunction of the indicator caused by an inclination of the rotational shaft as well as a rotational malfunction of the indicator caused by an engagement failure between the last-stage gear and the reduction gear can be avoided.

Figure 1:
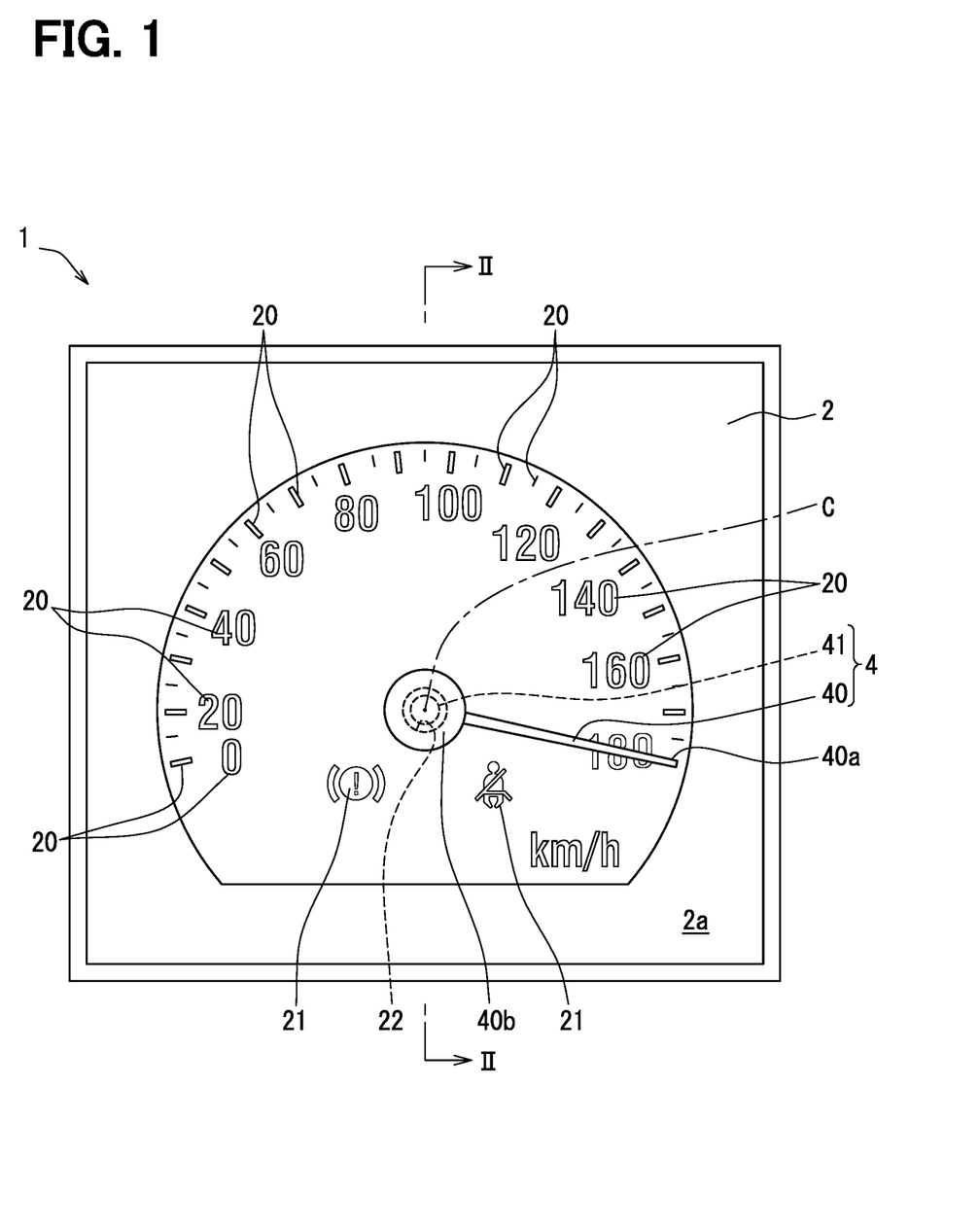
FIG. 1 is a front view illustrating an indicator instrument for a vehicle, according to an embodiment.
Figure 2:
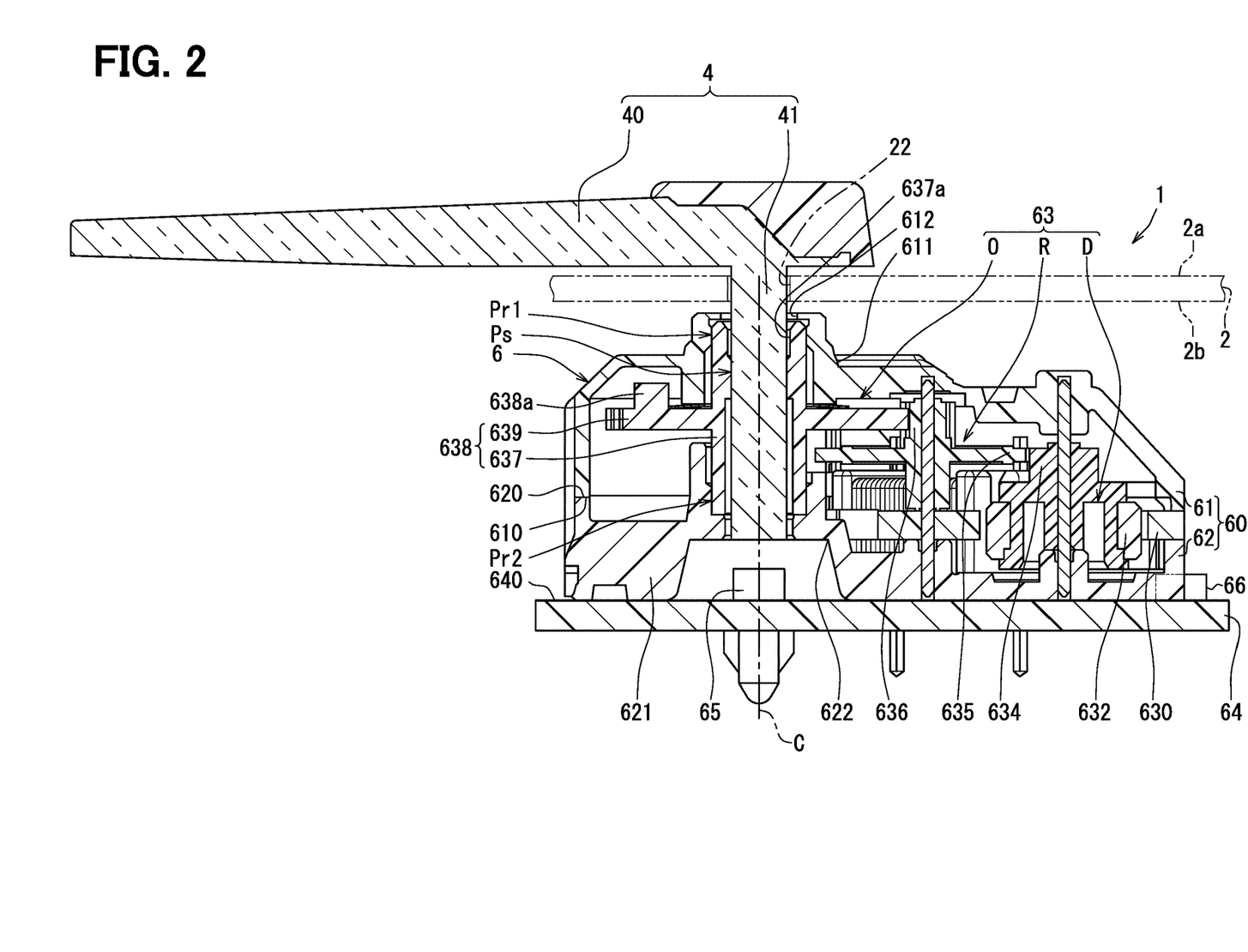
FIG. 2 is a cross-sectional view taken along the line II-II in FIG. 1 and illustrating the indicator instrument for a vehicle, which includes a stepper motor according to the embodiment.

Hereinafter, an embodiment of the present disclosure will be described according to the drawings. As shown in FIGS. 1 and 2, an indicator instrument 1 for a vehicle according to the embodiment is mounted in an instrument panel in a vehicle cabin. The indicator instrument 1 for the vehicle includes a display 2, a rotational indicator 4, and a stepper motor 6. In following description, a "visible side" of an object is a side on which an occupant on a driver seat in the vehicle cabin sees an indication by the indicator instrument 1, and a "non-visible side" of an object is a side opposite to the visible side.

The display 2 is formed by laminating a light-shielding printed layer on a light-transmitting base material made of, for example, polycarbonate. The display 2 has a flat plate shape as a whole. A display surface 2a of the display 2 is disposed on the visible side of the display 2. As shown in FIG. 1, opening portions of the light-shielding printed layer of the display 2 form numbers and scales arranged in a rotational direction of the rotational indicator 4 as indexes 20 to indicate a "vehicle state parameter". The vehicle state parameter in the present embodiment is a vehicle speed as shown in FIG. 1, but the vehicle state parameter may be a physical quantity related to the vehicle such as a rotational speed of an engine. The opening portions of the light-shielding printed layer of the display 2 form warning lamps 21 for issuing of warnings around a rotational shaft 41 of the rotational indicator 4.

The rotational indicator 4 is made of light-transmitting resin such as acrylic resin, and includes an indicator body 40 and the rotational shaft 41. The indicator body 40 has an elongated needle shape as a whole and disposed on the visible side of the display surface 2a of the display 2. A tip end 40a of the indicator body 40 indicates the vehicle state parameter shown by the indexes 20 according to the rotational position of the indicator body 40. As shown in FIGS. 1 and 2, the rotational shaft 41 has a circular cylindrical shape extending from a non-visible side of a base end 40b of the indicator body 40. Thus, the indicator body 40 protrudes radially outward from the rotational shaft 41 like a cantilever.

The rotational shaft 41 is inserted in an indicator hole 22 that passes through the display 2 between opposite surfaces 2a and 2b. The rotational shaft 41 is connected to the stepper motor 6 on a non-visible side of the back surface 2b of the display 2. The stepper motor 6 rotates the rotational indicator 4 around a rotational center axis C that is an axis of the rotational shaft 41, thereby the above-described indication by the indicator body 40 is achieved.

As shown in FIG. 2, the stepper motor 6 is disposed on the non-visible side of the back surface 2b of the display 2. The stepper motor 6 includes a motor casing 60, a motor body 63, a motor base board 64, and illuminants 65, 66.

Figure 3:
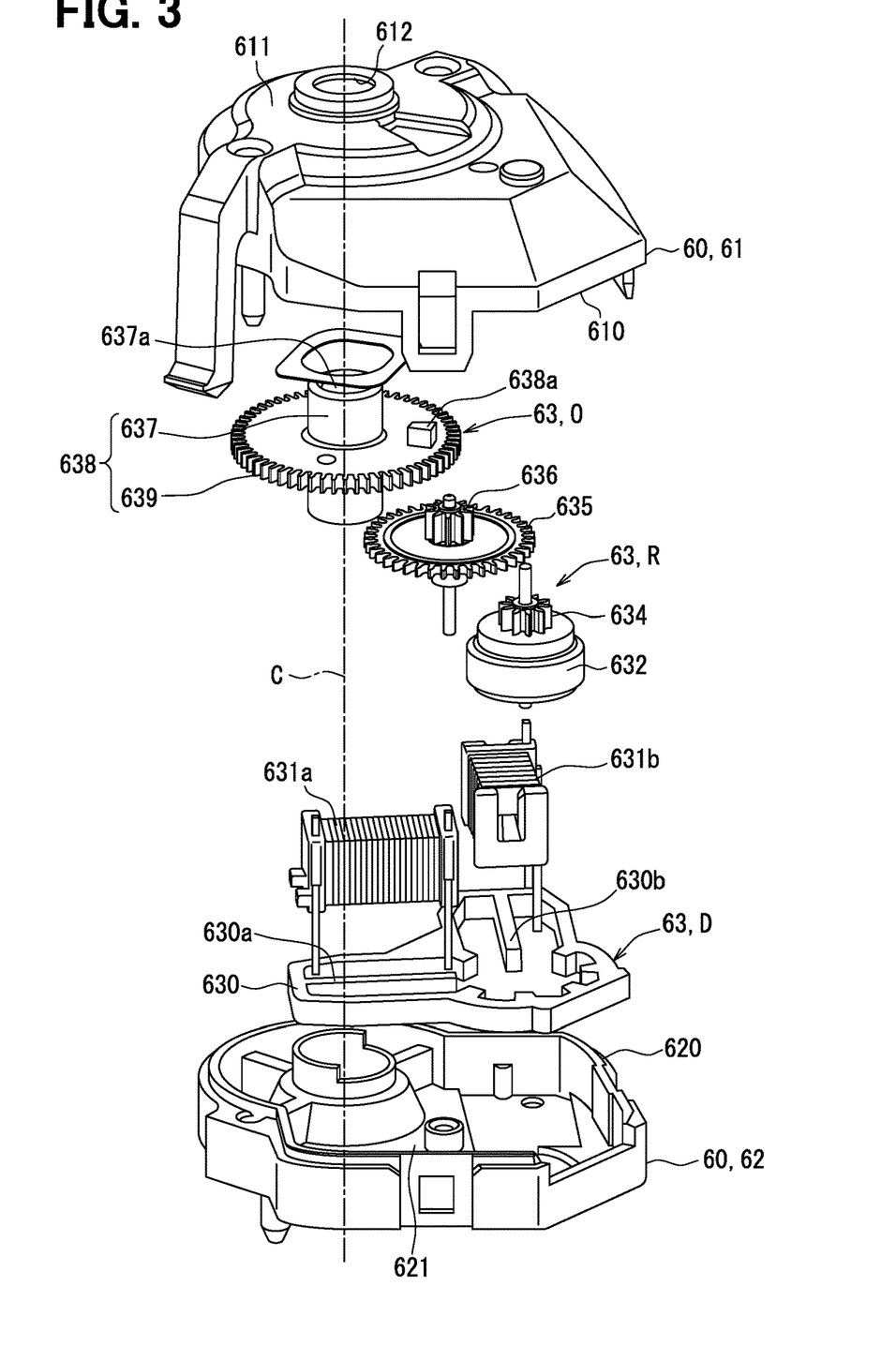
FIG. 3 is an exploded perspective view illustrating the stepper motor according to the embodiment.

As shown in FIGS. 2 and 3, the motor casing 60 includes a first case element 61 and a second case element 62 which are combined with each other. The motor casing 60 has a hollow shape as a whole. Each case element 61, 62 is made of light-shielding resin such as modified polyphenylene ether (m-PPE) and formed to have a cup shape. The first case element 61 is snap-fitted to the second case element 62 such that an opening edge 610 of the first case element 61 overlaps an opening edge 620 of the second case element 62. The first case element 61 includes a through hole 612 that passes through a bottom wall 611 of the first case element 61 on the rotational center axis C of the indicator body 40. The second case element 62 includes a through hole 622 that passes through a bottom wall 621 of the second case element 62 on the rotational center axis C of the indicator body 40. The first case element 61 is disposed on a non-visible side of the display 2 and faces the back surface 2b. The second case element 62 is disposed on a non-visible side of the first case element 61.

As shown in FIG. 2, the motor base board 64 is formed by laminating a metal wiring layer on a print substrate such as glass epoxy substrate. The motor base board 64 has a flat plate shape as a whole. The motor base board 64 is disposed on a non-visible side of the motor casing 60. A mounting surface 640 of the motor base board 64 has a flat surface and supports the motor casing 60, and the illuminants 65, 66.

As shown in FIGS. 2 to 5, the motor body 63 is housed in the motor casing 60. The motor body 63 is mounted on the mounting surface 640 of the motor base board 64 through the motor casing 60. The motor body 63 includes a driving mechanism D, a reduction mechanism R, and a rotational output mechanism O.

The driving mechanism D includes a yoke 630, two-phase coils 631a, 631b, and a magnet rotor 632 which are combined with each other. The driving mechanism D is displaced from the rotational center axis C of the indicator body 40 in a radial direction. The yoke 630 is made of magnetic metal such as iron, formed to have a frame shape, and fixed to the motor casing 60. The yoke 630 has a pair of magnetic poles 630a and 630b protruding inward of the yoke 630. The A-phase coil 631a and the B-phase coil 631b are respectively wound around the magnetic pole 630a and the magnetic pole 630b. The A-phase coil 631a and the B-phase coil 631b are each electrically connected to the metal wiring layer of the motor base board 64 through a through hole passing through the second case element 62 of the motor casing 60.

The magnet rotor 632 is made of magnetic metal such as ferrite to have a disk shape. The magnet rotor 632 is disposed inward of the yoke 630 and away from the magnetic poles 630a and 630b. The magnet rotor 632 is radially and axially supported by the motor casing 60 such that the magnet rotor 632 is rotatable around an axis that is substantially parallel with the rotational center axis C of the indicator body 40. An outer peripheral part of the magnet rotor 632 is magnetized such that N-poles and S-poles as magnetic poles are alternately arranged in the rotational direction.

In the driving mechanism D having such configuration, an external control circuit applies alternating-current signals shifted by 90 degrees in phase from each other to the A-phase coil 631a and the B-phase coil 631b, respectively, through the metal wiring layer of the motor base board 64. Alternating-current magnetic flux is generated in each of the coils 631a, 631b, flows between the yoke 630 and the magnet rotor 632, and thereby drives the magnet rotor 632 to a predetermined rotational position.

The reduction mechanism R includes a magnet gear 634, an idle gear 635, and a pinion gear 636 which are combined with each other as a reduction gear and is displaced from the rotational center axis C of the indicator body 40 in the radial direction. The magnet gear 634 is made of hard resin such as polyoxymethylene (POM) resin to have a spur gear shape. The magnet gear 634 is radially and axially supported by the motor casing 60 such that the magnet gear 634 is rotatable together with the magnet rotor 632.

The idle gear 635 and the pinion gear 636 are made of hard resin such as polybutylene terephthalate (PBT) and integrally and coaxially formed with each other. Each of the idle gear 635 and the pinion gear 636 has a spur gear shape. The idle gear 635 and the pinion gear 636 are radially and axially supported by the motor casing 60 such that the gears 635, 636 are together rotatable around an axis that is substantially parallel with the rotational center axis C of the indicator body 40. The idle gear 635 is engaged with the magnet gear 634 to reduce a rotational speed of the magnet gear 634.

The rotational output mechanism O includes an output gear 638 and a rotation stopper 638a which are combined with each other, and is located on the rotational center axis C of the indicator body 40. The output gear 638 and the rotation stopper 638a are made of hard resin such as polyoxymethylene resin (POM) and integrally formed with each other. The output gear 638 and the rotation stopper 638a are radially and axially supported by the motor casing 60 such that the output gear 638 and the rotation stopper 638a are together rotatable around the rotational center axis C of the indicator body 40.

The output gear 638 integrally includes an output shaft 637 and a last-stage gear 639. The output shaft 637 has a hollow cylindrical shape having a center hole 637a as a whole. The center hole 637a of the output shaft 637 is coaxial with and faces the through hole 612 extending through the first case element 61 of the motor casing 60 in the axial direction. The rotational shaft 41 of the rotational indicator 4 is coaxially press-fitted to the center hole 637a of the output shaft 637. The output shaft 637 outputs rotational torque to the rotational indicator 4 by rotating together with the rotational indicator 4 around the rotational center axis C. The last-stage gear 639 has a spur gear shape extending radially outward from the output shaft 637. The last-stage gear 639 is engaged with the pinion gear 636 to reduce the rotational speed of the pinion gear 636. In such the motor body 63, rotational torque increased via speed reduction from the driving mechanism D to the reduction mechanism R is transmitted to the rotational indicator 4 from the rotational output mechanism O.

The rotation stopper 638a includes a projection protruding from a visible side of the last-stage gear 639. The rotation stopper 638a is provided to be capable of contacting fixed stoppers of the motor casing 60 at limit positions that define a rotational range of the rotational indicator 4. When rotational torque is transmitted from the rotational output mechanism O to the rotational indicator 4, the rotation stopper 638a prevents rotation of the rotational indicator 4 outside the rotational range.

As shown in FIG. 2, the rotor illuminant 65 is located inside the through hole 622 of the second case element 62, disposed on the rotational center axis C of the indicator body 40, and mounted on the mounting surface 640 of the motor base board 64. The rotor illuminant 65 mainly includes a Light Emitting Diode (LED) and is electrically connected to the metal wiring layer of the motor base board 64. The rotor illuminant 65 is illuminated when energized by an external control circuit through the metal wiring layer. A light emitted from the rotator illuminant 65 passes through the through hole 622 of the second case element 62 and the center hole 637a of the output shaft 637, and enters the rotational shaft 41 of the rotational indicator 4. Then, the light is guided to the indicator body 40 of the rotational indicator 4. Accordingly, the rotational indicator 4 is illuminated through the motor body 63, and thus the indicator body 40 becomes luminous to be visually recognized.

The multiple display illuminants 66 are disposed around the second case element 62 and mounted on the mounting surface 640 of the motor base board 64. Each display illuminant 66 mainly includes a LED and is electrically connected to the metal wiring layer of the motor base board 64. Each display illuminant 66 is illuminated by being energized by the external control circuit through the meatal wiring layer when a corresponding warning is required. A light emitted from the display illuminants 66 passes nearby the circumference of the motor casing 60 and is incident on the display 2. Accordingly, the display 2 is directly illuminated, and thus the warning lamp 21 becomes luminous to be visually recognized when the warning is required.

A detail configuration of the indicator instrument 1 for the vehicle will be explained with reference to FIGS. 6 and 7. In the following explanations, an axial direction along the rotational center axis C, a radial direction substantially orthogonal to the rotational center axis C, and a circumferential direction around the rotational center axis C that are shown in FIGS. 6, 7 are respectively referred to as an axial direction, a radial direction, and a circumferential direction.

Figure 6:
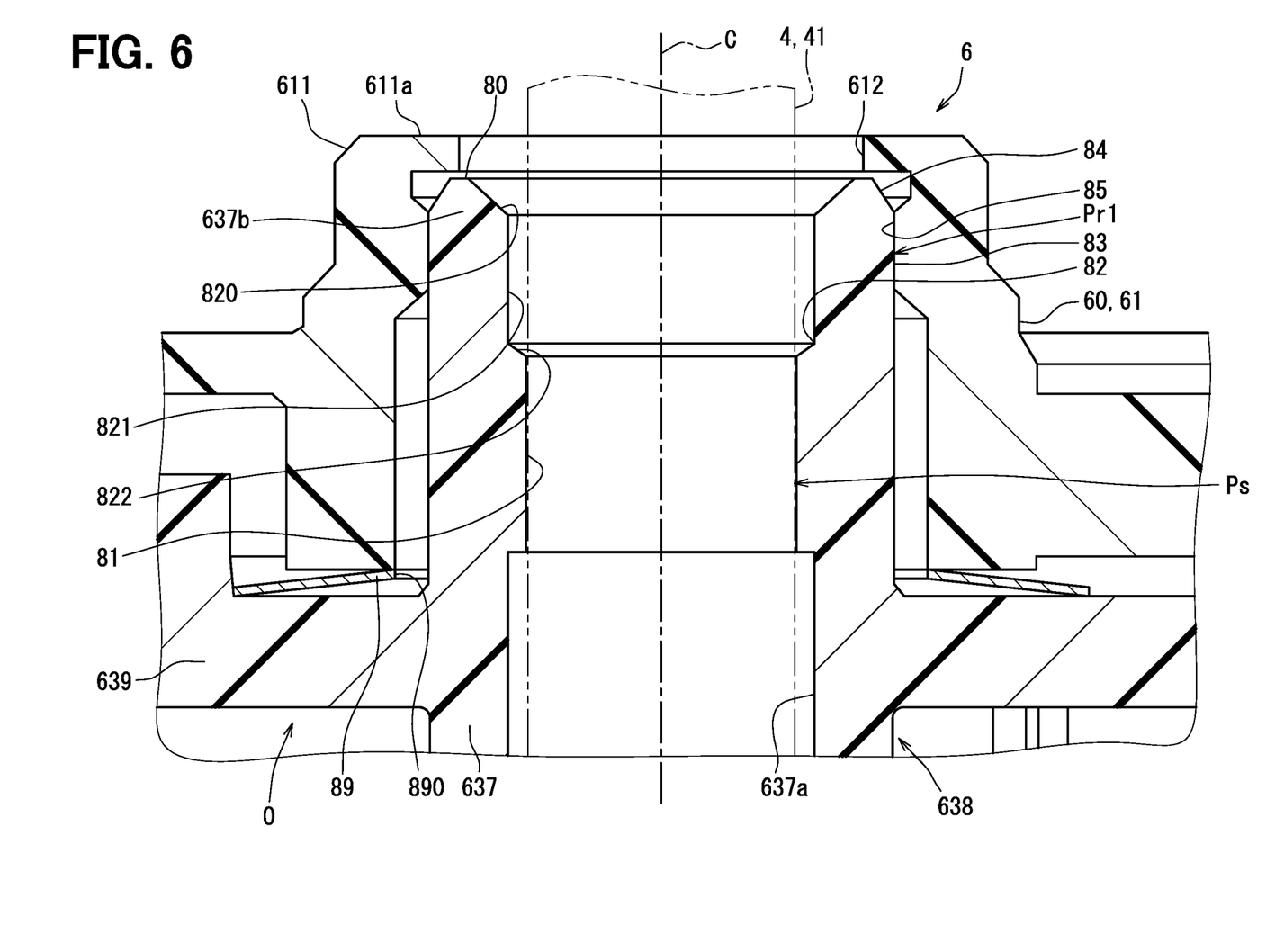
FIG. 6 is an enlarged cross-sectional view illustrating a part of FIG. 2.
Figure 7:
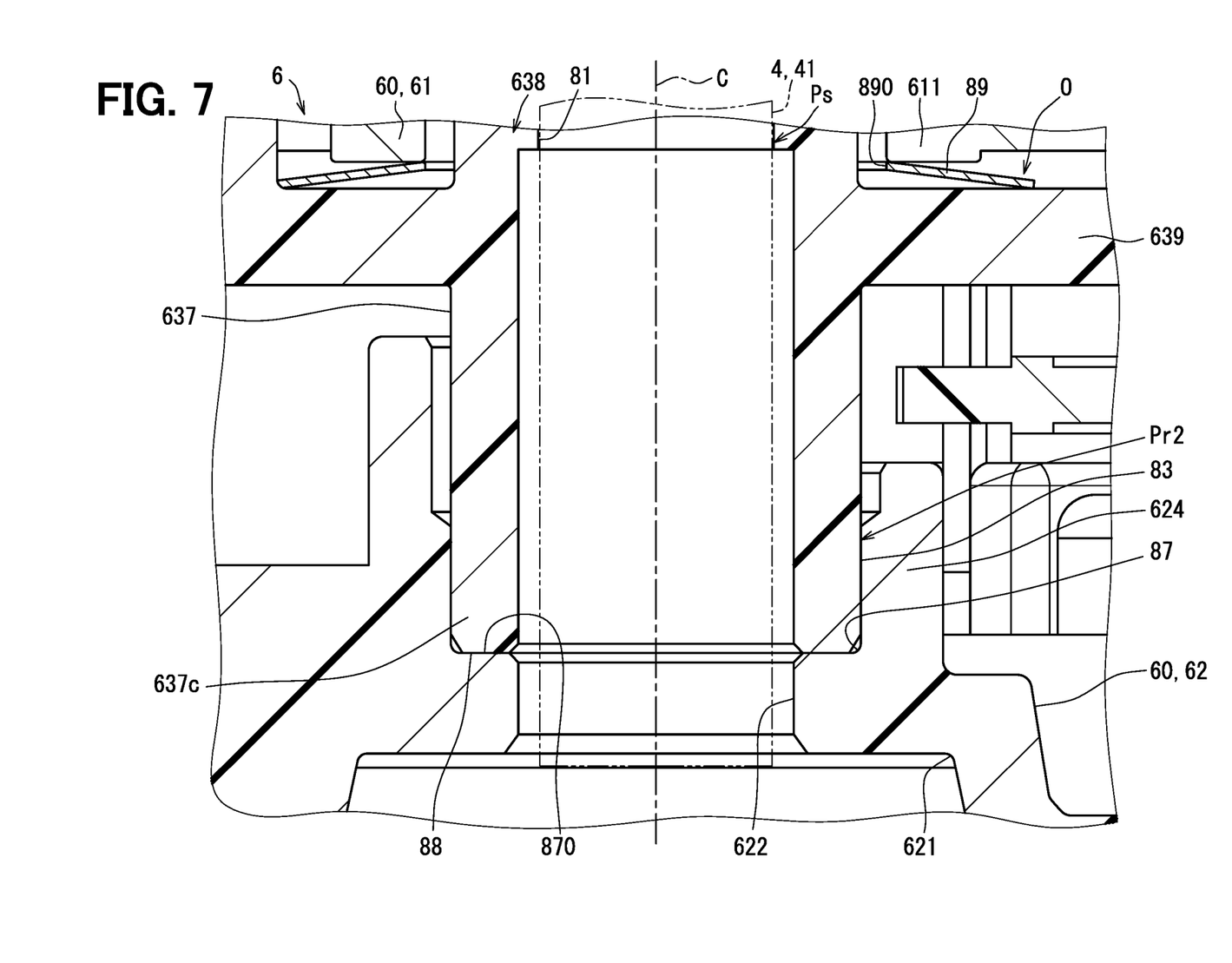
FIG. 7 is an enlarged cross-sectional view illustrating a part of FIG. 2.

As shown in FIG. 6, a tip 637b of the output shaft 637 is inserted in the through hole 612 of the first case element 61 of the motor casing 60. The tip 637b of the output shaft 637 has an annular flat end surface which forms a peak 80. The center hole 637a of the output shaft 637 which has an opening at the peak 80 of the tip 637b includes a pressed hole portion 81 and an opening hole portion 82 that are arranged in the axial direction.

The pressed hole portion 81 is located within a predetermined range of the output shaft 637 in the axial direction, and the predetermined range is on a non-visible side of the peak 80 and on a visible side of the last-stage gear 639. The predetermined range is distanced from the peak 80 and the last-stage gear 639. The pressed hole portion 81 has a cylindrical shape extending straight along the axial direction. An inner diameter of the pressed hole portion 81 is smaller than the inner diameter of the peak 80. A part of the rotational shaft 41 in the axial direction is coaxially inserted in the pressed hole portion 81. The rotational shaft 41 has a larger diameter than the pressed hole portion 81 before inserted in the pressed hole portion 81, and thus, the rotational shaft 41 is inserted in the pressed hole portion 81 with an interference therebetween for press-fitting. Therefore, the rotational shaft 41 is press-fitted to the pressed hole portion 81 in a specified portion Ps of the output shaft 637 that is displaced in the axial direction from the last-stage gear 639 toward the indicator body 40 (i.e., away from the visible side of the last-stage gear 639), so that the rotational shaft 41 is rotatable together with the output shaft 637 in the motor casing 60.

The opening hole portion 82 is defined by a stepped inner peripheral surface of the output shaft 637 within a predetermined range from the peak 80 to the pressed hole portion 81 in the axial direction. Accordingly, the opening hole portion 82 includes inner tapered surfaces 820, 822, and an inner straight surface 821. The first inner tapered surface 820 is gradually reduced in diameter from an inner peripheral edge of the peak 80 toward the pressed hole portion 81 in the axial direction to have a tapered shape (i.e., truncated cone shape). The inner straight surface 821 extends from a non-visible side of the first inner tapered surface 820 (i.e., inner edge portion of the first inner tapered surface 820) straight in the axial direction to have a cylindrical shape. The second inner tapered surface 822 is gradually reduced in diameter from a non-visible side of the inner straight surface 821 to the pressed hole portion 81 in the axial direction to have a tapered shape (i.e., truncated cone shape). The opening hole portion 82 including the inner tapered surfaces 820, 822 and the inner straight surface 821 has a larger inner diameter than the pressed hole portion 81, i.e., the specified portion Ps of the center hole 637*a* to which the rotational shaft 41 is press-fitted. The opening hole portion 82 faces toward the through hole 612.

The output shaft 637 further includes an outer straight surface 83 and an outer tapered surface 84 which are provided and arranged in the axial direction on an outer peripheral side of the peak 80 of the tip 637*b*. The outer straight surface 83 is located within a predetermined range of the output shaft 637 in the axial direction and the predetermined range is located away from the non-visible side of the peak 80. The outer straight surface 83 has a cylindrical shape extending straight along the axial direction. The outer diameter of the outer straight surface 83 is larger than an outer diameter of the peak 80. The outer tapered surface 84 is located within a predetermined range of the output shaft 637 in the axial direction from the outer peripheral edge of the peak 80 to the outer straight surface 83. The outer tapered surface 84 is gradually enlarged in diameter from the peak 80 toward a supported portion Pr1 of the output shaft 637 supported by a first bearing 85, which is described later. The outer tapered surface 84 has a tapered shape (i.e., truncated cone shape).

The first case element 61 of the motor casing 60 includes the first bearing 85 which is a part of the through hole 612 in the axial direction. The first bearing 85 is located within a predetermined range of the first case element 61 in the axial direction, and the predetermined range is located away from an end surface 611*a* of the bottom wall 611 on a non-visible side of the end surface 611*a*. An inner peripheral surface of the first bearing 85 has a cylindrical shape extending straight along the axial direction. An inner diameter of the first bearing 85 is smaller than inner diameters of parts of the through hole 612 located on different sides of the first bearing 85 in the axial direction.

A part of the outer straight surface 83 located on the visible side of the last-stage gear 639 in the axial direction is coaxially inserted in the first bearing 85 in a whole axial range of the first bearing 85. In the present embodiment, the outer straight surface 83 having a slightly smaller diameter than the first bearing 85 is fitted into the inner peripheral part of the first bearing 85 such that the outer straight surface 83 is slidable relative to the first bearing 85. The first bearing 85 supports the outer peripheral part of the output shaft 637 in the radial direction.

The specified portion Ps of the output shaft 637 press-fitted to the rotational shaft 41 is displaced from the supported portion Pr1 of the first bearing 85 in the axial direction away from the indicator body 40 (i.e., away from a non-visible side of the supported portion Pr1). The specified portion Ps is displaced also from the last-stage gear 639 in the axial direction. Thus, the rotational shaft 41 is press-fitted to the specified portion Ps of the pressed hole portion 81 of the output shaft 637, and the specified portion is between the last-stage gear 639 and the supported portion Pr1 of the output shaft 637 supported by the first bearing 85.

As shown in FIG. 7, the second case element 62 of the motor casing 60 includes a tubular part 624 protruding from a visible side of the bottom wall 621 in the axial direction, and a part of the tubular part 624 in the axial direction forms a second bearing 87. The second bearing 87 is located within a predetermined range in the axial direction from the bottom wall 621 of the second case element 62. The second bearing 87 has a bottomed hollow cylindrical shape coaxially connected to the through hole 622 of the second case element 62, and an inner peripheral surface of the second bearing 87 extends straight in the axial direction. An inner diameter of the second bearing 87 is larger than an inner diameter of the through hole 622. Accordingly, a bottom surface 870 of the second bearing 87 has an annular flat surface.

A part of the outer straight surface 83 of the output shaft 637 which is located on a non-visible side of the last-stage gear 639 in the axial direction is coaxially inserted in the second bearing 87 in a whole axial range of the second bearing 87. In the present embodiment, the outer straight surface 83 having a slightly smaller diameter than the second bearing 87 is fitted with the inner peripheral part of the second bearing 87 such that the outer straight surface 83 is slidable relative to the second bearing 87. The output shaft 637 has an end surface 88 having the annular flat surface at a base end 637*c* that is on a non-visible side of the output shaft 637 opposite to the peak 80 in the axial direction. The end surface 88 is in surface contact with the bottom surface 870 of the second bearing 87 such that the end surface 88 is slidable relative to the bottom surface 870. Thus, the second bearing 87 radially supports the outer peripheral part of the output shaft 637 and also axially supports the non-visible side of the output shaft 637 which is opposite to the peak 80 in the axial direction.

The specified portion Ps of the output shaft 637 press-fitted to the rotational shaft 41 is displaced from the last-stage gear 639 and a supported portion Pr2 of the output shaft 637, supported by the second bearing 87, in the axial direction toward the indicator body 40 (i.e., away from a visible side of the supported portion Pr2). As shown in FIGS. 6 and 7, the first bearing 85 located closer to the indicator body 40 and the second bearing 87 are separated from each other in the axial direction. As described in the above configuration, the rotational shaft 41 is press-fitted to the specified portion Ps of the pressed hole portion 81 of the output shaft 637 displaced from each supported portions Pr1, Pr2 and the last-stage gear 639, and the specified portion is between the supported portion Pr1 of the output shaft 637 supported by the first bearing 85 and the supported portion Pr2 of the output shaft 637 supported by the second bearing 87 in the axial direction.

Figure 4:
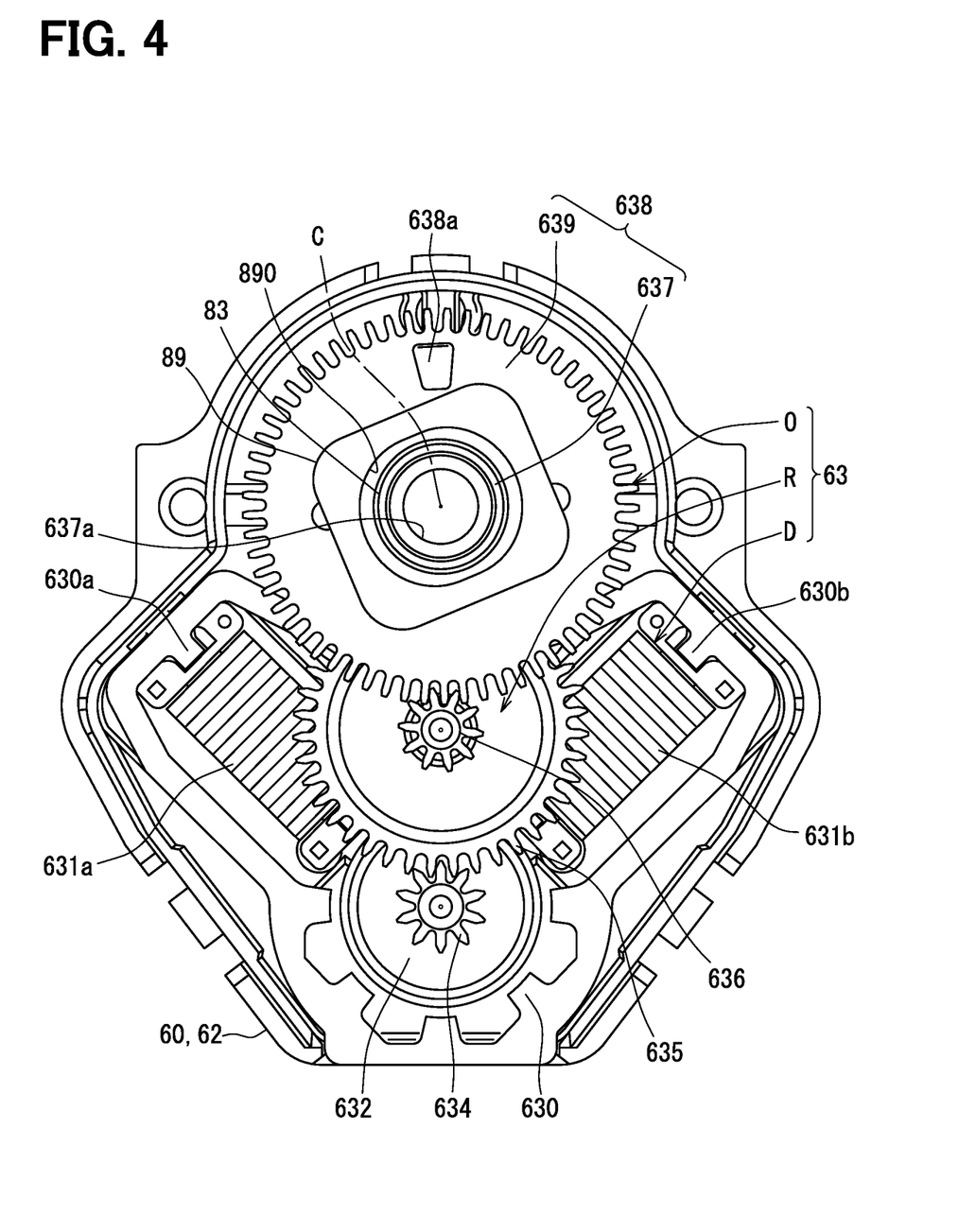
FIG. 4 is a top view illustrating an inside of the stepper motor according to the embodiment.
Figure 5:
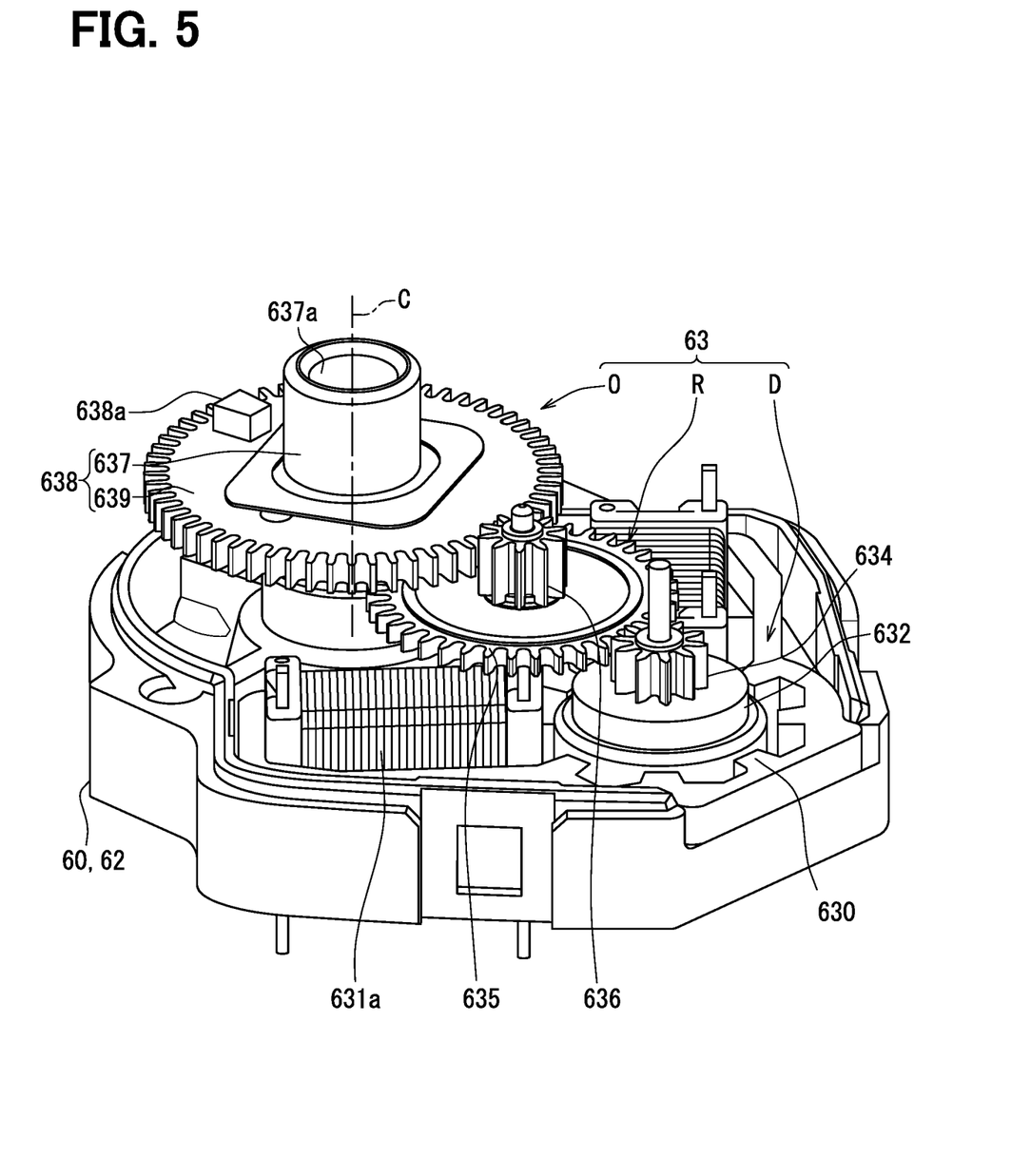
FIG. 5 is a perspective view illustrating the inside of the stepper motor according to the embodiment.

As shown in FIGS. 4, 6, and 7, the rotational output mechanism O includes an urging unit 89 in addition to the output gear 638 and the rotation stopper 638*a*. The urging unit 89 is made of elastic metal, such as stainless steel (SUS), to have a plate spring shape. The urging unit 89 has a center hole 890 having a cylindrical shape and coaxially located with the outer straight surface 83 of the output shaft 637. The center hole 890 of the urging unit 89 surrounds the outer peripheral part of the outer straight surface 83. The urging unit 89 is interposed and compressed between the bottom wall 611 of the first case element 61 and the last-stage gear 639, and whereby elastically deformed such that the urging unit 89 is rotatable together with the output gear 638. The urging unit 89 urges the last-stage gear 639 away from the indicator body 40 in the axial direction (i.e., away from a non-visible side of the indicator body 40) regardless of a rotational position of the output gear 638, such that the end surface 88 of the output shaft 637 is pressed against the bottom surface 870 of the second bearing 87 of the motor casing 60.

Hereinafter, effects of the indicator instrument 1 will be explained.

The rotational shaft 41 of the rotational indicator 4 in the indicator instrument 1 for a vehicle is press-fitted to the specified portion Ps of the output shaft 637 of the output gear 638 which is displaced from the last-stage gear 639 in the axial direction. This displacement prevents strain due to the press-fitting from propagating to the last-stage gear 639 distanced from the specified portion Ps. Thus, even inside the motor casing 60, the strain can be prevented from propagating to and plastically deforming the last-stage gear 639 and causing an engagement failure between the last-stage gear 639 and the pinion gear 636 as the reduction gear. Therefore, a rotational malfunction of the rotational indicator 4 caused by the engagement failure between the last-stage gear 639 and the pinion gear 636 can be avoided.

Further, the rotational indicator 4 includes the indicator body 40 protruding radially outward, and thus, a gravity center of the rotational shaft 41 is likely to be close to the indicator body 40. In this respect, since the rotational shaft 41 is press-fitted to the specified portion Ps of the output shaft 637 displaced from the last-stage gear 639 toward the indicator body 40, the specified portion Ps is located closer to or overlapped with the gravity center. Thus, the rotational shaft 41 and the output shaft 637 are less likely to be inclined relative to the original rotational center axis C. Thus, a rotational malfunction of the rotational indicator 4 caused by the inclinations of the rotational shaft 41 and the output shaft 637, as well as a rotational malfunction of the rotational indicator 4 caused by an engagement failure between the last-stage gear 639 and the pinion gear 636, can be avoided.

The urging unit 89 urges the last-stage gear 639 away from the indicator body 40 in the axial direction, and thereby the end surface 88 of the output shaft 637 is pressed against the motor casing 60. Therefore, the output shaft 637 can be further prevented from being inclined by not only the specified portion Ps of the output shaft 637 being press-fitted to the rotational shaft 41 between the indicator body 40 and the last-stage gear 639 so as to be close to or overlapped with the gravity center of the rotational shaft 41, but also the end surface 88 of the output shaft 637 being pressed against the motor casing 60. Accordingly, this enhances the effect to avoid a rotational malfunction of the rotational indicator 4 caused by the inclinations of the rotational shaft 41 and the output shaft 637.

The specified portion Ps of the output shaft 637 press-fitted to the rotational shaft 41 is displaced from the supported portion Pr1, Pr2 supported by the bearings 85, 87 in the axial direction, as well as from the last-stage gear 639 in the axial direction. These displacements prevent strain due to press-fitting from propagating not only to the last-stage gear 639 distanced from the specified portion Ps, but also to the supported portions Pr1, Pr2 distanced from the specified portion Ps. If the strain caused by press-fitting propagates to the last-stage gear 639 and thereby the last-stage gear 639 is elastically deformed, the engagement failure between the last-stage gear 639 and the pinion gear 636 may occur. In addition, if the strain caused by press-fitting propagates to the supported portions Pr1, Pr2 of the output shaft 637 and thereby the supporting portions Pr1, Pr2 are elastically deformed, the supporting failure between the supported portions Pr1, Pr2 and the bearings 85, 87 may occur. Therefore, the displacements of the specified portion Ps can prevent such supporting failure as well as such engagement failure. Thus, a rotational malfunction of the rotational indicator 4 caused by the engagement failure between the last-stage gear 639 and the pinion gear 636 and also by the supporting failure of the output shaft 637 by the bearings 85, 87 can be avoided.

The rotational shaft 41 is press-fitted to the specified portion Ps of the output shaft 637 which is displaced from the last-stage gear 639 in the axial direction and is between and displaced in the axial direction from the supported portions Pr1, Pr2 supported by the bearings 85, 87. This configuration prevents strain due to press-fitting from propagating not only to the last-stage gear 639 distanced from the specified portion Ps, but also to the supported portions Pr1, Pr2 distanced from the specified portion Ps of the output shaft 637. If the strain by press-fitting propagates to the last-stage gear 639 and thereby the last-stage gear 639 is elastically deformed, the engagement failure between the last-stage gear 639 and the pinion gear 636 may occur. In addition, the elastic deformation of the last-stage gear 639 and the inclination of the output shaft 637 may result in the supporting failure between the output shaft 637 and the bearings 85, 87. Therefore, this configuration can prevent such supporting failure as well as such engagement failure. Thus, a rotational malfunction of the rotational indicator 4 caused by the engagement failure between the last-stage gear 639 and the pinion gear 636 and also by the supporting failure of the output shaft 637 by the bearings 85, 87 can be avoided.

The opening hole portion 82 of the center hole 637a of the output shaft 637 having a larger diameter than the specified portion Ps faces toward the through hole 612 extending through the motor casing 60 in the axial direction of the output shaft 637. Therefore, before the rotational shaft 41 is press-fitted to the specified portion Ps, a rotational torque outputted from the output shaft 637 can be checked without press-fitting by, for example, attaching a torque-check attachment to the opening hole portion 82 having the large diameter.

Figure 8:
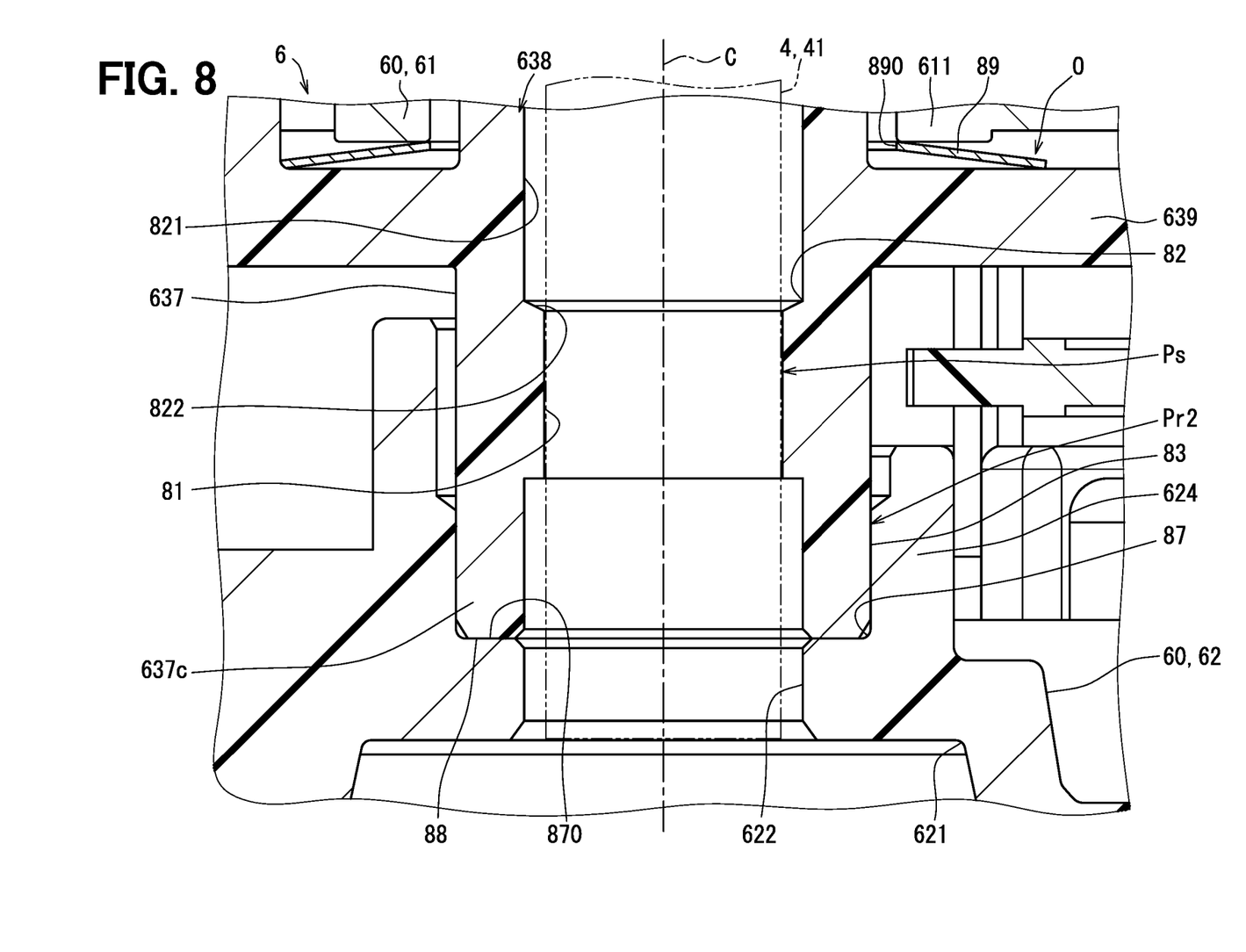
FIG. 8 is a cross-sectional view illustrating a modification of FIG. 7.
Figure 9:
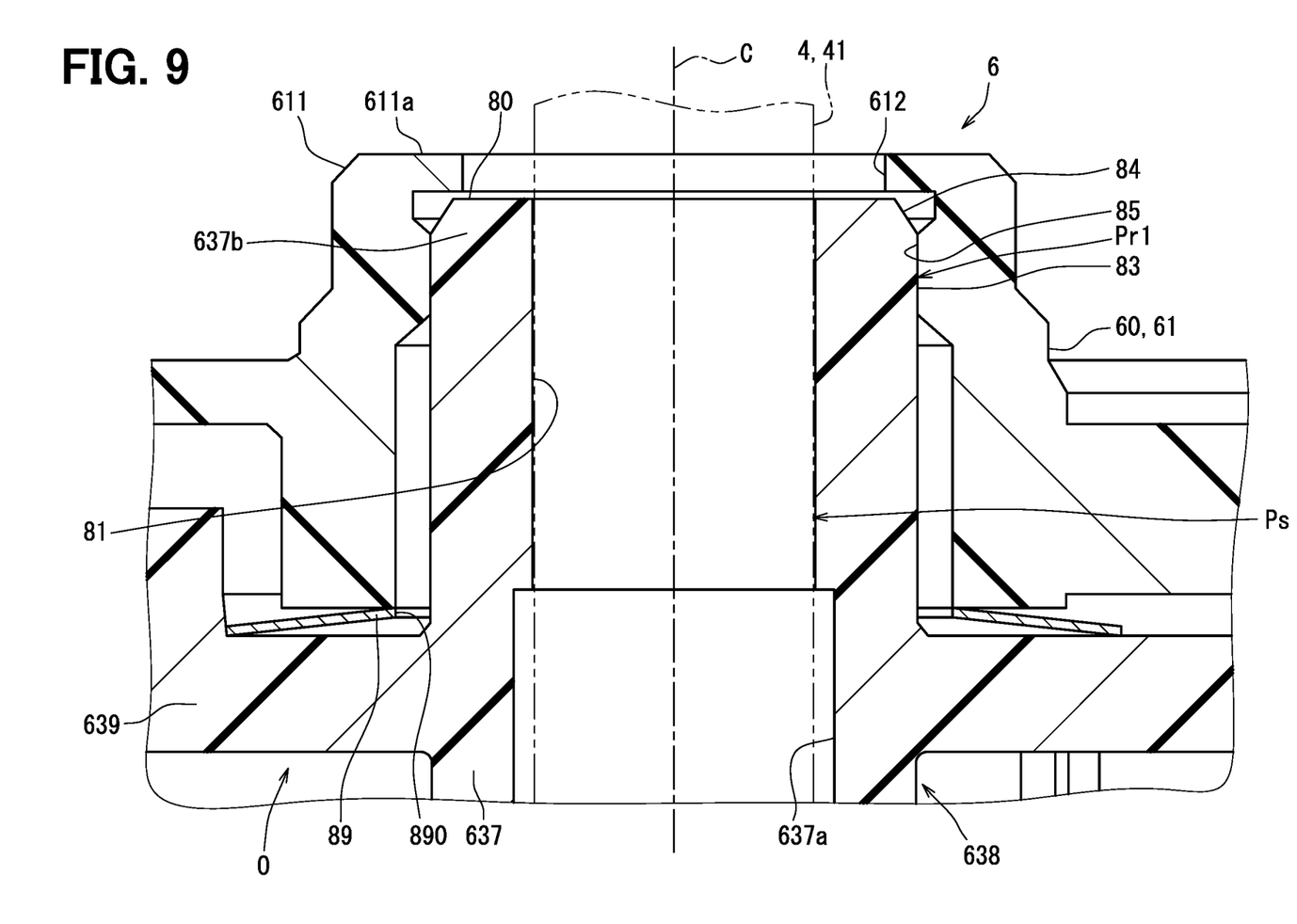
FIG. 9 is a cross-sectional view illustrating a modification of FIG. 6.

The embodiment of the present disclosure was explained, but the present disclosure is not limited to the embodiment and can be applied to various embodiments and combinations in a range without departing from the gist of the present disclosure Concretely in a first modification, as shown in FIG. 8, the specified portion Ps of the pressed hole portion 81 of the output shaft 637 press-fitted to the rotational shaft 41 may be displaced from the last-stage gear 639 and located further from the indicator body 40 than the last-stage gear 639 is in the axial direction (i.e., on the non-visible side of the last-stage gear 639). In a second modification, as shown in FIG. 9, the specified portion Ps of the pressed hole portion 81 press-fitted to the rotational shaft 41 may be overlapped with at least one of the supported portions Pr1, Pr2 supported by the bearings 85, 87 in the radial direction. In FIG. 9, the specified portion Ps is overlapped with the first supported portion Pr1 in the radial direction and displaced from the second supported portion Pr2 in the axial direction as with the preceding embodiment.

Figure 10:
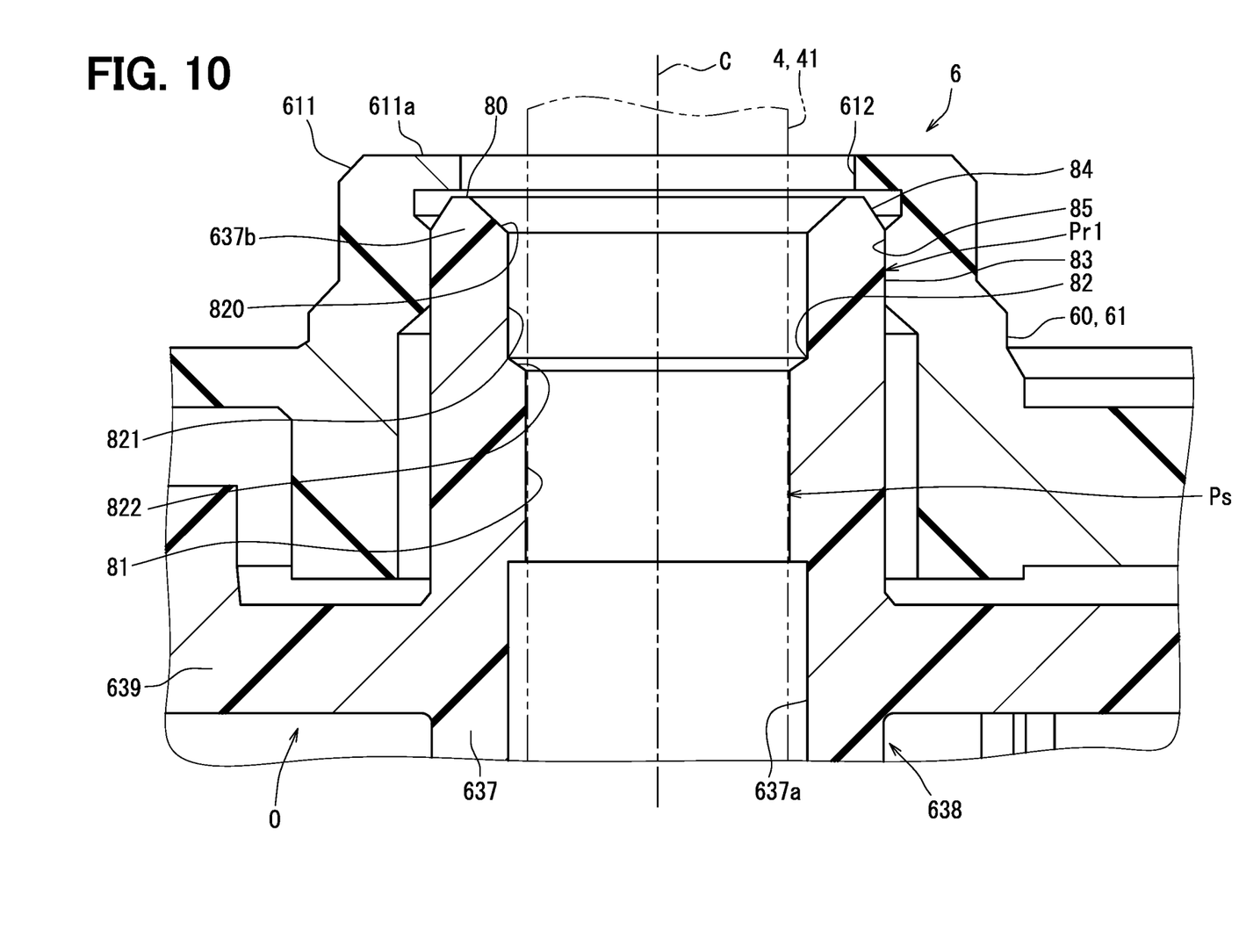
FIG. 10 is a cross-sectional view illustrating a modification of FIG. 6.
Figure 11:
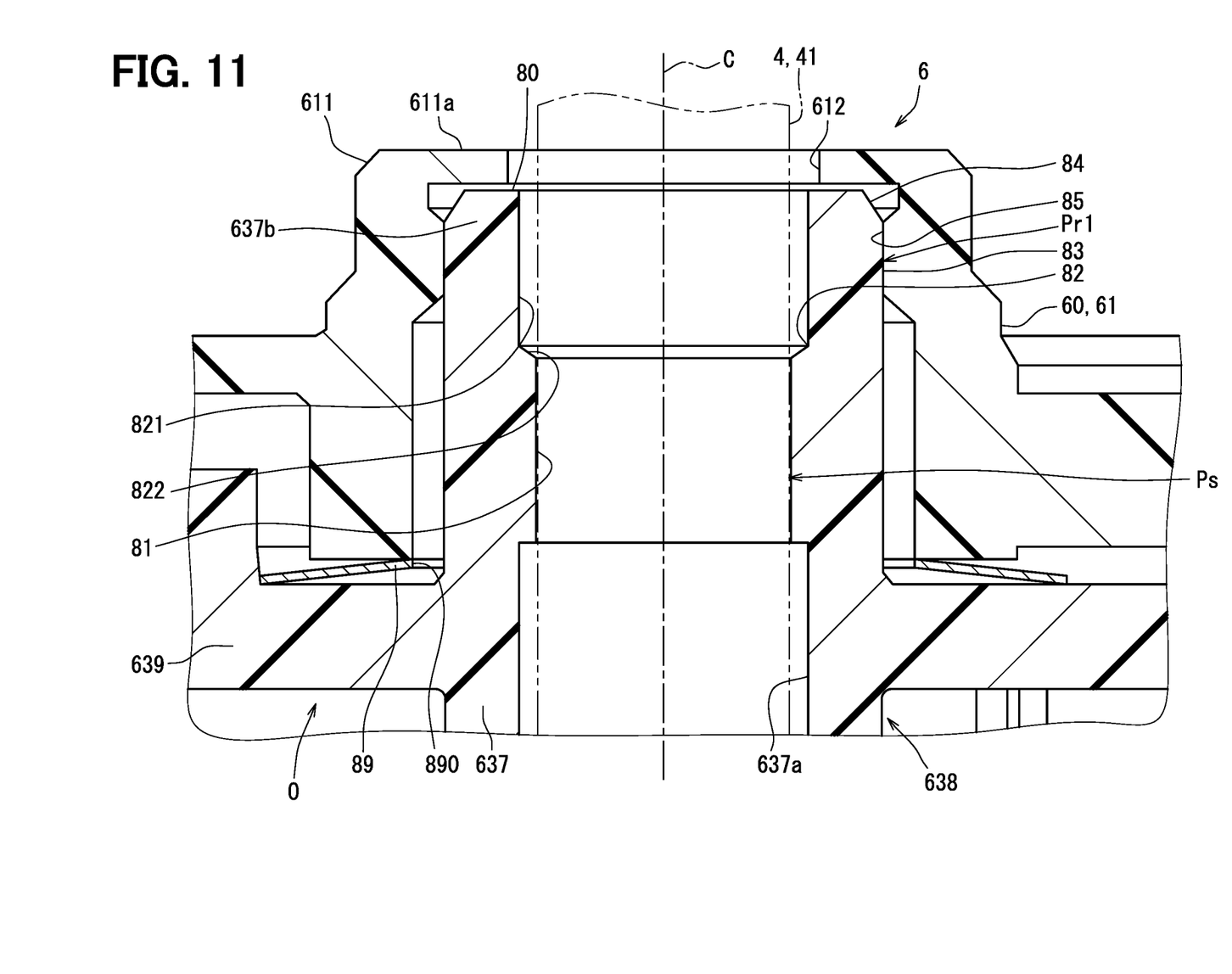
FIG. 11 is a cross-sectional view illustrating a modification of FIG. 6.

In a third modification, as shown in FIG. 10, the urging unit 89 may not be necessarily provided. In a fourth modification, as shown in FIG. 9, the center hole 637a may not necessarily include the opening hole portion 82. In a fifth modification, as shown in FIG. 11, the opening hole portion 82 may include one or two of the first inner tapered surface 820, the second inner tapered surface 822, and the inner straight surface 821. In FIG. 11, the opening hole portion 82 includes only the second inner tapered surface 822 and the inner straight surface 821 as a representative example.

The rotational shaft 41 in a sixth modification may be fixed to the specified portion Ps of the pressed hole portion 81 with adhesive in addition to or in place of press-fitting. The rotational shaft 41 in a seventh modification may be snap-fitted to the specified portion Ps of the pressed hole portion 81 without a substantial interference between the rotational shaft 41 and the pressed hole portion 81 for press-fitting in place of being press-fitted to the specified portion Ps of the pressed hole portion 81.

The present disclosure is descripted in reference to the embodiments, but the present disclosure is not limited to the above-mentioned embodiments and structures. The present disclosure includes various modifications and variations in a range of equality. In addition, various elements in the present disclosure are described in various combinations and embodiments, but other combinations and embodiments having more elements or less elements than in the present disclosure, or having one element of the elements are included in a scope and a technical range of the present disclosure.

What is claimed is:

1. An indicator instrument for a vehicle, comprising:
   a rotational indicator configured to indicate a vehicle state parameter; and
   a stepper motor configured to rotate the rotational indicator, wherein
   the stepper motor includes:
      an output gear including an output shaft rotatable together with the rotational indicator, and a last-stage gear extending radially outward from the output shaft;
      a reduction mechanism including a reduction gear engaged with the last-stage gear; and
      a motor casing housing the output gear and the reduction mechanism,
   the rotational indicator includes a rotational shaft press-fitted to a specified portion of the output shaft in the motor casing,
   the motor casing includes a bearing configured to support the output shaft,
   the specified portion is between and displaced in the axial direction from the last-stage gear and a supported portion of the output shaft supported by the bearing,
   the specified portion of the output shaft extends radially inward toward the rotational shaft and contacts the rotational shaft, and
   the supported portion of the output shaft is separated from the rotational shaft by an empty gap.

2. The indicator instrument according to claim 1, wherein
   the rotational indicator includes an indicator body protruding radially outward from the rotational shaft and indicating the vehicle state parameter, and
   the specified portion of the output shaft to which the rotational shaft is press-fitted is displaced from the last-stage gear toward the indicator body in the axial direction.

3. The indicator instrument according to claim 2, further comprising
   an urging unit configured to urge the last-stage gear away from the indicator body in the axial direction such that an end surface of the output shaft is pressed against the motor casing.

4. The indicator instrument according to claim 1, wherein
   the motor casing includes the bearing as a first bearing and a second bearing, and the first and second bearings are distanced from each other in the axial direction and support the output shaft, and
   the specified portion of the output shaft to which the rotational shaft is press-fitted is between and displaced in the axial direction from the supported portion supported by the first bearing and a supported portion of the output shaft supported by the second bearing.

5. The indicator instrument according to claim 1, wherein
   the motor casing includes a through hole extending through the motor casing in the axial direction of the output shaft,
   the output shaft includes a center hole facing toward the through hole, and
   the center hole includes an opening hole portion having a larger diameter than an inner diameter of the specified portion to which the rotational shaft is press-fitted.

6. The indicator instrument according to claim 1, wherein an outer circumference of the specified portion of the output shaft is surrounded by an empty space without being supported by the bearing.

* * * * *